United States Patent [19]

Johnson et al.

[11] 4,115,849
[45] Sep. 19, 1978

[54] DATA INTERFACE BRIDGE

[75] Inventors: Bill E. Johnson; John E. Dannenmann, Jr., both of Portland, Oreg.

[73] Assignee: Bejed, Inc., Portland, Oreg.

[21] Appl. No.: 762,999

[22] Filed: Jan. 27, 1977

[51] Int. Cl.² .................. H04Q 3/64; H03K 17/00
[52] U.S. Cl. ..................... 340/147 CV; 340/147 T
[58] Field of Search .................. 178/2 R, 3, 50, 58 R, 178/68; 340/172, 147 B, 147 CV, 147 G, 147 LP, 147 T; 307/215, 218, DIG. 1; 364/900 MS File, 200 MS File

[56] References Cited

U.S. PATENT DOCUMENTS

| | | | |
|---|---|---|---|
| 3,434,113 | 3/1969 | Wiley | 364/900 |
| 3,581,289 | 5/1971 | Wilhelm | 364/200 |
| 3,643,223 | 2/1972 | Ruth | 364/200 |
| 3,810,105 | 5/1974 | England | 364/200 |
| 3,872,444 | 3/1975 | Cleveland | 364/200 |
| 3,899,775 | 8/1975 | Larsen | 364/900 |

Primary Examiner—James D. Thomas

[57] ABSTRACT

An interface unit for interconnecting data terminals and data sets in a serial binary data communication system. The unit includes a plurality of standard multipin connectors, one for each data device being interconnected. Binary signals received at the data input pin of any connector are transmitted to the data output pins of each other connectors simultaneously. A return copy option is provided whereby signals received at a connector's input pin are also transmitted to its output pin. The disclosed device provides an essentially transparent interface between multiple data terminals and data sets at transmission rates up to at least 9600 baud.

10 Claims, 3 Drawing Figures

DATA INTERFACE BRIDGE

BACKGROUND AND OBJECTS OF THE INVENTION

The present invention relates generally to data communication systems, and in particular to apparatus for interconnecting data terminal and data communication equipment in a serial binary data communication system.

In general terms, a data communication system consists of a group of functional units whose primary purpose is to transfer digital data between two or more locations in a reliable manner. Some systems transfer messages between remote terminals via one or more switching centers; other systems transmit data from numerous remote terminals to a central data processing facility.

With few exceptions, digital data communications systems generate and receive signals in serial bit form. The signals are typically generated as DC pulses with a negative voltage representing a binary 1, or a "marking" condition, and a positive voltage representing a binary 0, or a "spacing" condition. Although the signals may be transmitted in that form, in low speed systems for example, modern high speed systems convert the voltage pulses to another form for transmission. The latter function is performed by a modulation/demodulation unit referred to as a modem or data set.

Each end of a data communication system includes a unit for either generating or receiving data, or both. Such units, called data terminal equipment, include keyboard terminals, CRT display terminals, paper tape punches, computers, etc. Data is received from or transmitted to the terminal equipment by the previously-mentioned modem or data set, called data communication equipment in general terms. The connection between the data terminal and data set is referred to as an electrical interface.

The most common electrical interface for serial data communication and data terminal equipment in the United States is that specified in Electronic Industries Association (E.I.A.) Standard RS-232-C. The RS-232-C standard defines electrical characteristics of the interchange signals and associated circuitry, specifies pin assignments for a 25 pin interface connector, and functionally describes the various data, timing and control interface circuits.

Often there is a need to connect several terminals or the like to a common data set or modem. In the past this has been accomplished by "hubbing". For half duplex operation, hubbing involves connecting the terminals in parallel with the data set — output-to-output and input-to-input — through suitable leg circuits. All of the inputs and outputs are then connected to a common point, or hub. For full duplex operation, the terminals are connected in parallel, i.e., with their inputs all tied to one common point and their outputs to another. The common input and output points than are cross-connected to the data set output and input, respectively. Again, each unit is connected to the others through individual leg circuits.

Hubbing has a number of drawbacks, particularly in the full duplex arrangement. In that mode, for example, the terminals on the hub cannot communicate with each other, but only with the remote terminal. If more than a few terminals are involved, hubbing becomes disadvantageous because of the need for individual leg circuits for each data device. In addition to the expense involved in providing the circuits, system speed may need to be reduced so that all of the circuits remain synchronized.

It is, accordingly, a general object of the present invention to provide improved means for interconnecting serial data terminal and communication equipment without the drawbacks associated with prior art means.

A further general object is to provide data equipment interconnection apparatus that provides an electrically transparent interface between the connected equipment.

Another more specific object of the invention is to provide a multiple input-output port interface unit for bridging together a plurality of data terminals and data sets in a desired arrangement.

Still another object of the invention is to provide an interface bridge having three or more I-O ports conforming to the EIA RS-232-C interface standard.

Yet another object is to provide a multiport interface bridge capable of accepting signals from any one of three or more connected data units and transmitting them to the other units, any of which units may be a data terminal or a data set.

A further object of the invention is to provide an interface unit of the type just described that provides an option of returning signals to the originating unit.

Still a further object is to provide a multiport interface unit having means for indicating visually the receipt or transmission of data at each interface port.

SUMMARY

These and other objects of the invention are realized by the provision of a multiport data interface bridge having a multipin electrical connector for each port. The data input pin of each connector is electrically connected to a corresponding signal line in a binary-data bus. Circuit means including logic circuitry operatively connects each signal line to the data output pin of each connector, so that a signal received at any input pin is transmitted simultaneously to all of the output pins. Provision is made for inhibiting the transmission of the signal to the output pin of the port from which it originated, if desired. According to a preferred embodiment, means are provided for converting signal voltage levels representing marking and spacing conditions at the input pins to integrated circuit logic levels at the bus, and for reconverting the logic levels to marking and spacing signal voltages at the output pins after certain logic operations have been performed on the converted signal. The presence of spacing signal voltages at the various input and output pins is indicated by light emitting devices, suitably LED's, associated with the pins.

The full, lawful scope of the present invention is set forth with paticularity in the appended cliams. However, the various objects, features and attendant advantages of the invention will be best understood and appreciated by reference to the following description of a preferred embodiment read in conjunction with the accompanying drawings.

DETAILED DESCRIPTION

Figure 1:
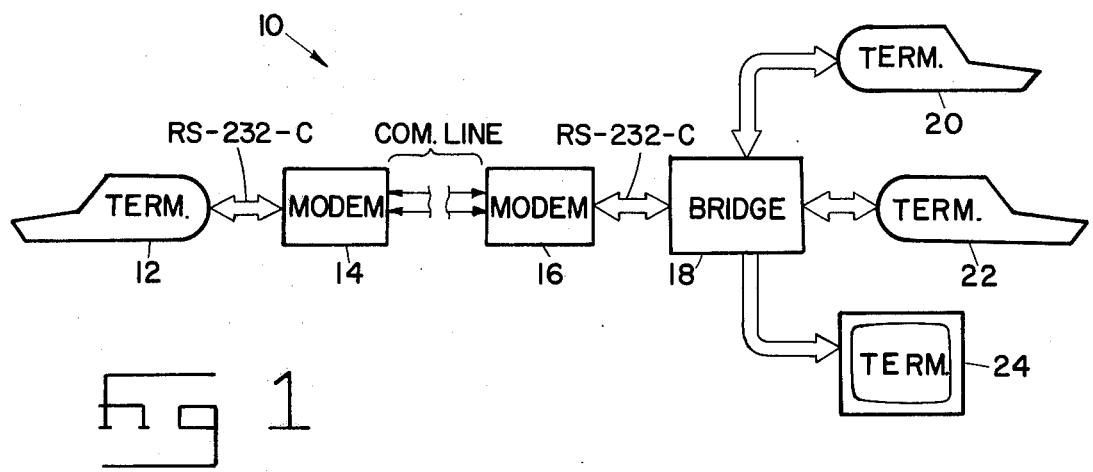
FIG. 1 is a block diagram of a data communications system incorporating a data interface bridge according to the present invention.

Turning now to the drawings, and first to FIG. 1 thereof, a serial bit data communications system 10 is shown to include a keyboard data terminal 12 bidirectionally coupled via an EIA RS-232-C interface to a modem 14. As will be understood, modem 14 converts signal voltage levels corresponding to marking and spacing conditions, which the terminal is designed to operate with, to corresponding tone signals, and vice versa. A voice grade communications line, which may be a private or leased line or a common carrier circuit, connects modem 14 to a second modem 16. Modem 16 is connected at its RS-232-C interface connector to one port of a multiport data interface bridge 18 according to the present invention. Bridge 18 includes four ports in the embodiment shown, three adapted (by the type of connector provided) for connecting to data terminals, including keyboard terminals 20, 22 and CRT display terminal 24.

In the system illustrated, data signals generated by terminal 12 are converted to tones by modem 14 and transmitted via the communications line to modem 16, which reconverts them into electrical voltage signals having the characteristics specified by the RS-232-C standard. Bridge 18 receives the voltage signals via the modem's interface connector, which mates with a corresponding connector provided in the bridge for interfacing with data sets, and distributes them to terminals 20, 22 and 24 simultaneously.

In a similar manner, data signals generated by terminal 22 are transmitted back to terminal 12, and are received by terminals 20 and 24 as well. Likewise, signals from terminal 20 are sent simultaneously to terminals 12, 22 and 24. In system 10, terminal 24 is adapted only for receiving data signals and cannot originate them. Any other type of data terminal designed for connection to an RS-232-C interface could be used in its place, however, without changing bridge 18.

By incorporating the data interface bridge of the invention in system 10, terminals 20, 22 and 12 are enabled to communicate with one another simultaneously in half duplex mode. Moreover, any two of the three can communicate with one another in full duplex mode if operating procedures are so arranged.

Figure 2:
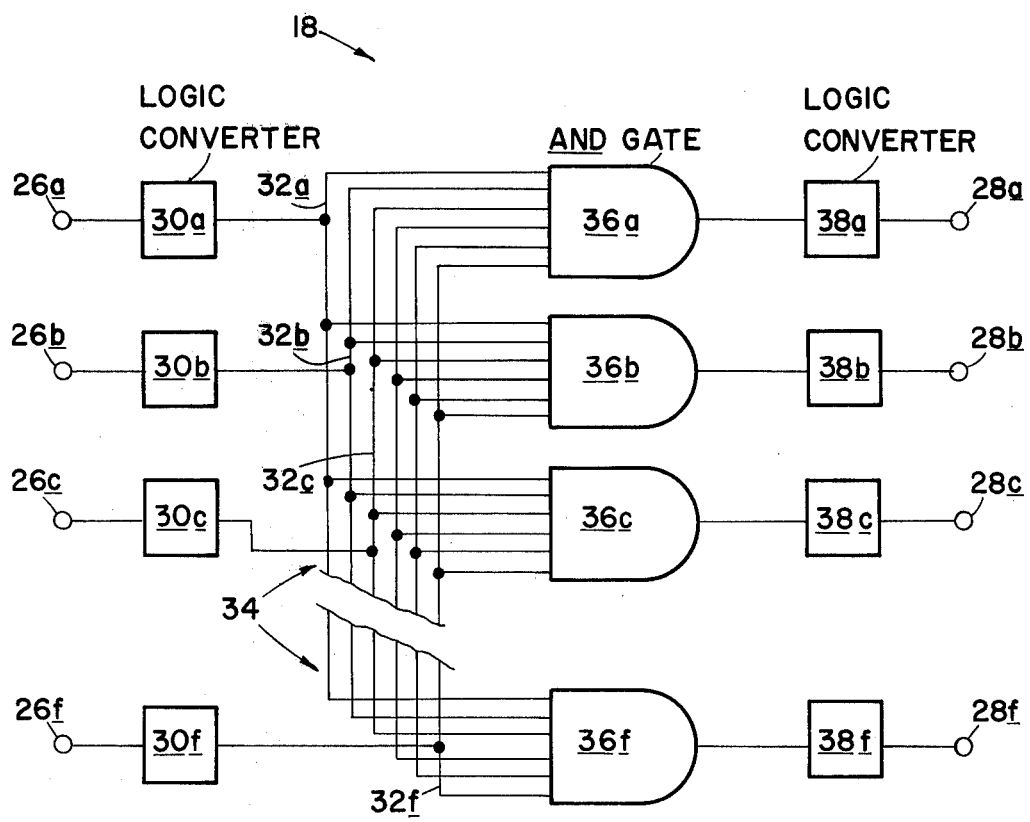
FIG. 2 is a functional block diagram of a multiport data interface bridge.

Referring now to FIG. 2, multiport data interface bridge 18 as shown therein includes data signal input pins 26a, 26b, 26c, ... 28f. As will be understood, each input pin and its corresponding output pin are mounted at appropriate locations in a 25 pin EIA RS-232-C interface connector (not shown), one such connector being provided in bridge 18 for each of six ports, four of which are shown in the drawings. Each input pin 26 is contacted via a logic convertor 30 to a corresponding binary signal line 32 in a bus 34. Bridge 18 further includes digital logic circuitry comprising multi-input AND gates 36a, 36b, 36c ... 36f. Each of the different signal lines 32a, 32b, 32c, ... 32f in bus 34 is connected to a corresponding input of each AND gate 36, as shown. The AND gate outputs are connected via logic converters 38a, 38b, 38c, ... 38f to output pins 28a, 28b, 28c, ... 28f, respectively.

Briefly explaining operation of the circuit, as in system 10 for example, when no data are being received, and during intervals between characters and words, input terminals 26 are held in a marking condition (binary state 1). Assuming no data is being transmitted to bridge 18, terminals 26a, 26b, 26c, ... 26f are in a marking condition characterized by a DC voltage in the range of −3 to −25V, nominally about −12V. Logic converters 30 convert the marking voltage to a voltage corresponding to binary state 1 in the logic system of the bridge's digital logic circuitry. If CMOS logic circuitry is used, for example, a voltage in the range of about +5 to +15VDC corresponds to a 1 state. Each line 32 thus is held in a 1 state when no data are being received, and each input of AND gates 36 is at a 1 state. Accordingly, the outputs of the gates are at logic state 1. Logic converters 38 reconvert the logic to that specified by the EIA standard, imposing a marking condition voltage on output pins 28.

When, during receipt of data at an input pin, a spacing condition voltage (binary state 0) is present on the pin, the corresponding bus signal line is placed in a 0 state by the pin's associated logic converter 30. All of the AND gate inputs connected to that signal line go to a 0 state, and because the gates' inputs are not all in a 1 state simultaneously, their outputs switch to a 0 state. Converters 38 respond to the change by switching pins 28 from a marking to a spacing condition. It will be seen that data received at any input terminal is sent simultaneously to all of the output terminals, but is prevented from being reflected back to the other input terminals.

Figure 3:
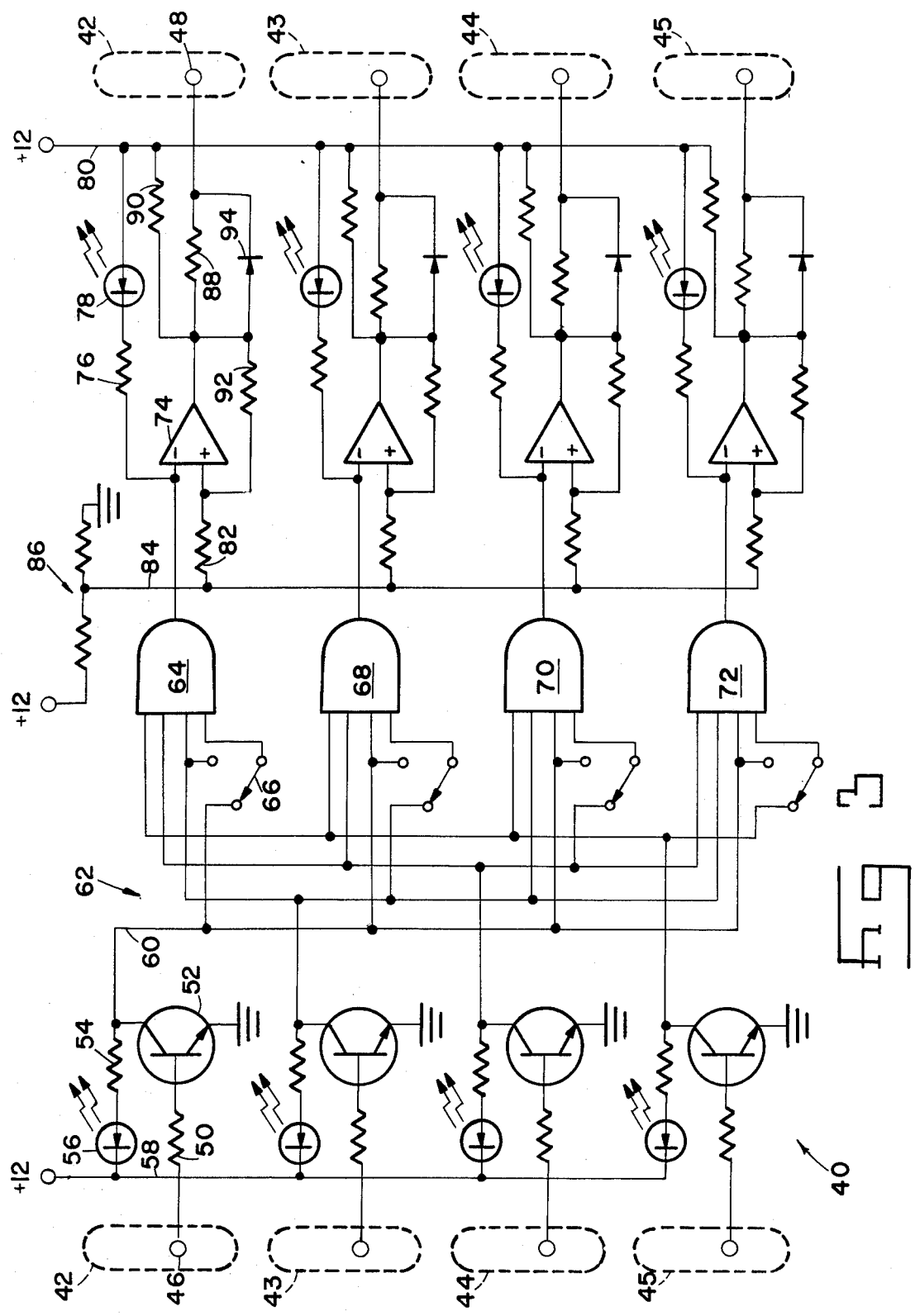
FIG. 3 is a schematic diagram of a preferred embodiment of the invention.

A circuit diagram of a four port data interface bridge 40 according to a preferred embodiment of the invention is shown in FIG. 3. As will be apparent, the electrical circuitry associated with each port in the bridge is essentially identical, and thus only the circuitry associated with one of the ports will be described in detail.

Bridge 40 includes four 25-pin RS-232-C connectors 42–45, with each connector having a data input pin 46 and a data output pin 48. It should be understood that the actual connector pin number of an input or output pin is determined by the type of connector provided. Ports for data terminal equipment have female connectors and those for data communication equipment, i.e., data sets, have male connectors. Thus, the data input pin for a data terminal port is connector pin 2, and the output pin is connector pin 3. In a data set port, the pin numbers are reversed. While bridge 40 typically is provided with connectors for two data sets and two data terminals, any number of each may be provided, limited only by the total number of ports in the bridge.

Input pin 46 is connected by a 3000 ohm terminating impedance resistor 50 to the base of an NPN transistor 52, the emitter of which is connected to ground. Transistor 52 suitably may be a Texas Instruments type TIS99. The collector of transistor 52 is connected by a resistor 54 to the anode of a light emitting diode (LED) 56, the cathode of which is connected to a +12 volt line 58. LED 56 is selected primarily on the basis of the color emission desired, and herein is a Chicago Miniature type CM4-83 (red). The collector of transistor 52 also is connected to a line 60 in a binary signal bus 62. Line 60 in turn is connected as shown to one input (the lower input in the figure) of a 4-input AND gate 64 through a SPDT switch 66, and to one input on each of three other 4-input AND gates 68, 70, 72. The AND gates are preferrably CMOS integrated circuit devices such as type 4082 gates manufactured by Fairchild and others.

The output of gate 64 is connected to the (−) or inverting input of a voltage comparator 74, suitably an integrated circuit comparator type LM339 manufactured by National Semiconductor, and to the cathode of an LED 78 through a resistor 76. LED 78, the anode of which is connected to a +12VDC line 80, suitably is a Monsanto type MV5253 (green). The (+) or noninverting input of comparator 74 is connected by a 1000 ohm isolation resistor 82 to a line 84. Line 84 is connected to the midpoint of a voltage divider 86. The output of comparator 74 is connected through a 3000 ohm source impedance resistor 88 to output pin 48, through a 3000 ohm pull-up resistor 90 to line 80, and through a 0.1 megohm feedback resistor 92 to the noninverting input. A diode 94 bridges resistor 88, with its cathode connected to the output pin.

As mentioned above, the circuitry associated with each of the other three parts in bridge 40 is essentially identical to that just described. Thus, bus 62 includes individual lines for each input pin, with each line being connected to one input on each of AND gates 64, 68, 70, 72. The connection to the AND gate associated with the same port as the bus line is made via a SPDT switch, as shown.

Describing now the operation of data interface bridge 40, each input pin is held in a marking condition when no data are being received, as mentioned earlier. A −6 to −12VDC (typically) potential thus is applied via resistor 50 to the base of transistor 52. The transistor is cut off (nonconducting) and its collector is at or near the +12V potential of line 58. Transistor 52 thus serves to convert the negative voltage that corresponds to binary state 1 at the RS-232-C interface to a positive voltage that corresponds to a binary state 1 for CMOS logic devices. The 1 state is applied to one input of each AND gate via line 60 of bus 62. With no data being received at any port, all of the other AND gate inputs are also in a 1 state, causing the gate output to be in a 1 state.

A potential of +6VDC is present at the (+) input of comparator 74, applied via resistor 82 from line 84. With the gate output in a 1 state, +12VDC is present at the comparator's (−) input. Being at a higher potential, the inverting input controls, resulting in a low voltage (about −12VDC) at the comparator output. Applied to output pin 48 via resistor 88, the voltage represents a marking condition at the output pin. Comparator 74 thus converts the CMOS logic 1 state to an RS-232-C 1 state.

When a positive voltage representing a spacing condition is present on input pin 46, transistor 52 conducts and its collector goes to near ground potential, or binary state 0. LED 56, being thus forward biased, conducts and emits light indicating the presence of a spacing condition (binary state 0) at the input pin. The 0 state is applied to the different AND gate inputs via bus 62, resulting in the output of the gate going to a 0 state, or ground potential. With the inverting input of comparator 74 at ground, its output goes high (+12VDC). The positive voltage is applied to output pin 48 via diode 94, bypassing resistor 88, and represents a spacing condition at the output pin. Grounding of the comparator's (−) input also causes LED 78 to conduct, signalling the presence of a spacing condition at pin 48.

Switch 66 at the input of AND gate 64, and the corresponding switches at the inputs of gates 68, 70, 72, provide the option of permitting so-called "return copy" or not as desired. Return copy, i.e., transmitting data received at a port's input pin to the output pin of the same port, must be inhibited during full duplex operation, for example. With switch 66 in its alternate position wherein bus signal line 60 is disconnected from gate 64, a binary state 0 on line 60 causes a change in the output of gates 68, 70 and 72 only, and gate 64 remains unaffected.

In operation, the data interface bridge of the invention is an essentially transparent interface, and is capable of operation at the highest data rate presently used with RS-232-C equipment, 9600 baud. Moreover, the bridge can be used in different baud-rate systems without modification.

Additional features include low power consumption and relatively simple, low cost construction.

Although a preferred embodiment of the invention has been disclosed herein for purposes of illustration, it is understood that certain variations and modifications are possible without departing from the spirit of the invention. For example, the multiple input AND gates described herein may be replaced if desired by NAND-gate inverter combinations.

We claim:

1. A multiport bridge for interconnecting data terminal and data communication equipment in a serial binary data communication system, said bridge having at least three equipment interface ports, comprising
   a multipin electrical connector for each port, each such connector having a data input pin and a separate data output pin, and
   circuit means operatively interconnecting said input and output pins for transmitting a data signal received at any port's data input pin simultaneously to all of the other port's data output pins, said circuit means including
   a multiconductor bus having an individual binary input signal line for each port,
   means electrically connecting each data input pin to a corresponding input signal line in the bus, and
   a plurality of multiple input logic circuits, one associated with each port for transmitting binary input signals from the bus to the data output pin of the associated port, the different inputs of each said logic circuit being individually connected to the different input signal lines in the bus, with the output of each circuit being connected to the associated port's output pin.

2. The bridge of claim 1, in which at least one of said logic circuits includes means for disconnecting the input thereof from the bus input signal line of said circuit's associated port, whereby data signals received at the associated port's input pin are not transmitted to that port's output pin.

3. A multiport bridge for interconnecting a plurality of data terminal and data set units in a serial binary data communication system wherein data is denoted by marking and spacing conditions, said bridge having at least three standardized electrical interface ports, comprising
   a multipin electrical connector for each port, each such connector having a data input pin and a separate data output pin,
   a multiconductor input signal bus having a different, individual binary data signal line for each port,
   first circuit means electrically connecting each data input pin to a corresponding signal line in said bus,
   a multiple input gate circuit for each port in the bridge, the different inputs of each such circuit being individually connected to the different signal lines in said bus, second circuit means electrically connecting the output of each gate circuit to a corresponding data output pin.

4. The bridge of claim 3, wherein said first circuit means electrically connecting the bus signal lines and connector input pins comprises means for converting signal voltages representing said marking and spacing conditions to corresponding semiconductor circuit logic levels, and said second circuit means comprises means for converting semiconductor circuit logic levels to such signal voltages.

5. The bridge of claim 3, further including means operatively connected to each input and output pin for indicating in a visually perceptable manner the presence on that pin of a signal voltage representing a spacing condition.

6. The bridge of claim 3, further including switch means for inhibiting the transmission of data signals from an input pin to an output pin in the same port's connector.

7. A multiport bridge for interconnecting a plurality of data terminal and data set units in a serial binary data communication system wherein data is denoted by marking and spacing conditions, said bridge having at least three standardized electrical interface ports, comprising a multipin electrical connector for each port, each such connector having a data input pin and a separate data output pin, a multiconductor bus having an individual binary input signal line for each port in the bridge, first circuit means electrically interconnecting each data input pin and a corresponding input signal line in the bus, said first circuit means including means for converting signal voltages applied by data terminal or data set units to said data input pins and representing marking and spacing conditions to analogous semiconductor circuit logic levels at the pins' corresponding input signal lines, second circuit means electrically connecting each data output pin to all of said input signal lines for unidirectional transmission of data from said bus to said output pins, said second circuit means including a multiple input logic gate for each port in the bridge, with each input signal line being individually connected to a different input of each gate, and further including means connecting the output of each gate to a corresponding data output pin, including means for converting semiconductor logic levels at the gates' outputs to signal voltages representing marking and spacing conditions at their corresponding data output pins, and means for disconnecting each port's logic gate from that port's input signal line to inhibit the transmission of data signals from the port's input pin to its output pin.

8. The bridge of 7, further including light emitting means operatively connected to each input and output pin for indicating the presence on that pin of a signal voltage representing a spacing condition.

9. The bridge of 7, wherein said connectors are EIA RS-232-C interface connectors.

10. The bridge of 7, wherein said logic gate is from the group consisting of AND and NAND gates.

* * * * *